(12) United States Patent
Chavarria Garcia et al.

(10) Patent No.: US 11,702,207 B2
(45) Date of Patent: Jul. 18, 2023

(54) BUSINESS CLASS SEATS FOR A PASSENGER VEHICLE

(71) Applicant: Safran Seats USA LLC, Gainesville, TX (US)

(72) Inventors: Daniel Abraham Chavarria Garcia, Chihuahua (MX); Mario Herrera, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 518 days.

(21) Appl. No.: 16/205,121

(22) Filed: Nov. 29, 2018

(65) Prior Publication Data
US 2020/0172248 A1    Jun. 4, 2020

(51) Int. Cl.
*B64D 11/06*    (2006.01)

(52) U.S. Cl.
CPC ...... *B64D 11/0601* (2014.12); *B64D 11/0605* (2014.12); *B64D 11/0606* (2014.12)

(58) Field of Classification Search
CPC . B64D 11/06; B64D 11/0601; B64D 11/0602; B64D 11/0604; B64D 11/0605; B64D 11/0606; B64D 11/064; B64D 11/0641
See application file for complete search history.

(56) References Cited

U.S. PATENT DOCUMENTS

| 7,025,306 B2 * | 4/2006 | Saint ................. | B64D 11/0601 244/118.6 |
| 7,178,871 B1 * | 2/2007 | Round ............... | B64D 11/0601 297/244 |
| D558,993 S * | 1/2008 | Saint-Jalmes ................. | D6/356 |
| 7,419,214 B2 | 9/2008 | Plant | |
| 7,607,612 B2 * | 10/2009 | Baatz ..................... | B64D 11/06 244/118.6 |

(Continued)

FOREIGN PATENT DOCUMENTS

| CN | 106536352 A | 3/2017 |
| EP | 3309071 A1 | 4/2018 |

(Continued)

OTHER PUBLICATIONS

PCT/US2019/063051, International Search Report and Written Opinion, 5 pages, dated Mar. 11, 2020.

(Continued)

*Primary Examiner* — Richard Green
*Assistant Examiner* — Michael A. Fabula
(74) *Attorney, Agent, or Firm* — Kilpatrick Townsend & Stockton LLP

(57) ABSTRACT

Passenger seat assemblies may be used in vehicles such as aircraft. The passenger seat assembly includes a first wall, a second wall opposite from the first wall, and a passenger seat having a first side and a second side opposite from the first side. The passenger seat is positioned between the first wall and the second wall. The passenger seat assembly is positionable between a forward-facing configuration and an aft-facing configuration. In both the forward-facing configuration and the aft-facing configuration, the first wall is proximate to the first side of the passenger seat and the second wall is proximate to the second side of the passenger seat.

2 Claims, 5 Drawing Sheets

(56) References Cited

U.S. PATENT DOCUMENTS

| | | | |
|---|---|---|---|
| 8,882,036 B2* | 11/2014 | Henshaw | B64D 11/0601 244/118.6 |
| D741,075 S* | 10/2015 | Lawson | D6/356 |
| D741,609 S* | 10/2015 | Williams | D6/356 |
| 9,302,774 B2* | 4/2016 | Henshaw | B64D 11/06 |
| 9,469,405 B2* | 10/2016 | Henshaw | B64D 11/00155 |
| D798,622 S* | 10/2017 | Grader | D6/356 |
| D799,226 S* | 10/2017 | Grader | D6/356 |
| 9,802,705 B2 | 10/2017 | Cooke et al. | |
| D830,712 S* | 10/2018 | Goode | D6/356 |
| 10,358,220 B2* | 7/2019 | Carlioz | B64D 11/0639 |
| 10,933,998 B2* | 3/2021 | Braca | B64D 11/0641 |
| 2003/0218095 A1* | 11/2003 | Saint Jalmes | B64D 11/0601 244/118.5 |
| 2009/0146004 A1* | 6/2009 | Plant | B64D 11/0643 244/118.5 |
| 2009/0302158 A1 | 12/2009 | Darbyshire et al. | |
| 2010/0193634 A1* | 8/2010 | Hankinson | B64D 11/06 244/118.6 |
| 2012/0318918 A1* | 12/2012 | Johnson | B64D 11/0604 5/2.1 |
| 2014/0361585 A1 | 12/2014 | Henshaw | |
| 2015/0166183 A1* | 6/2015 | Henshaw | B64D 11/0641 244/118.6 |
| 2017/0240283 A1* | 8/2017 | Dowty | B64D 11/0606 |
| 2018/0215468 A1 | 8/2018 | Savian | |
| 2019/0143845 A1* | 5/2019 | Akaike | B64D 11/0648 297/240 |

FOREIGN PATENT DOCUMENTS

| | | |
|---|---|---|
| WO | 20021831 A2 | 4/2000 |
| WO | 2009087028 A2 | 5/2009 |
| WO | 2011077366 A1 | 6/2011 |
| WO | 2014022484 A1 | 2/2014 |
| WO | 2010131014 A1 | 11/2020 |

OTHER PUBLICATIONS

China Patent Application No. 2019800786797, Office Action, dated Apr. 15, 2023.

* cited by examiner

BUSINESS CLASS SEATS FOR A PASSENGER VEHICLE

FIELD OF THE INVENTION

The invention relates to accommodations for passengers aboard passenger vehicles, and more particularly to arrangements of business class passenger seats within an aircraft.

BACKGROUND

In many instances, passenger vehicles, such as aircraft, buses, trains, ships, and automobiles, include a cabin in which passengers are seated and can move about. The arrangement of the cabin needs to provide optimum safety conditions and a sufficient number of seats per cabin to meet the economical requirements related to passenger transport while also providing the passengers a high level of comfort. Traditionally, to accommodate the space within the cabin, passenger seats arrangements have required two designs of passenger seat: a "standard" seat and a "mirrored" seat in which all the components of the seat are at a mirrored or opposite location compared to the corresponding standard seat. Because the components are mirrored, the same part and tooling cannot be used for both designs, and passenger seat arrangements require double the number of parts and tooling needed for the manufacturing and assembly of the seat, which in turn increases the cost to create the seat. Therefore, there still exists a need for a passenger seat and passenger seat arrangement that provides the desired number of seats within a cabin while minimizing and simplifying costs and manufacture.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly includes a first wall, a second wall opposite from the first wall, and a passenger seat having a first side and a second side opposite from the first side. The passenger seat is positioned between the first wall and the second wall. The passenger seat assembly is positionable between a forward-facing configuration and an aft-facing configuration, and, in both the forward-facing configuration and the aft-facing configuration, the first wall is proximate to the first side of the passenger seat and the second wall is proximate to the second side of the passenger seat.

In some aspects, the passenger seat assembly is configurable between the forward-facing configuration and the aft-facing configuration by rotating the passenger seat assembly in a clockwise direction. In various aspects, the first wall defines an opening providing access to the passenger seat. In certain examples, the second wall includes a privacy divider that is movable between a stowed position and a deployed position. In some cases, the second wall includes a table.

In various examples, the passenger seat assembly is configurable between the forward-facing configuration and the aft-facing configuration by rotating the passenger seat assembly in a counter-clockwise direction. In certain cases, the passenger seat includes a passenger seat surface extending between the first side and the second side. In some examples, the passenger seat surface is configured to support a passenger when used, and an orientation of the passenger seat surface relative to the first wall and the second wall is the same in both the forward-facing configuration and the aft-facing configuration.

According to certain embodiments of the present invention, a passenger seat arrangement includes two passenger seat assemblies, and each passenger seat assembly includes a first wall, a second wall opposite from the first wall, and a passenger seat having a first side and a second side opposite from the first side. The passenger seat is positioned between the first wall and the second wall such that the first side is proximate to the first wall and the second side is proximate to the second wall. A first passenger seat assembly of the two passenger seat assemblies is in a forward-facing configuration and a second passenger seat assembly of the two passenger seat assemblies is in an aft-facing configuration, and the second passenger seat assembly is rotated 180° relative to the first passenger seat assembly.

In certain examples, the second passenger seat assembly is rotated 180° clockwise relative to the first passenger seat assembly. In various examples, the second passenger seat assembly is rotated 180° counter-clockwise relative to the first passenger seat assembly.

In various aspects, the first wall of each passenger seat assembly defines an opening providing access to the passenger seat, and the second wall of each passenger seat assembly comprises a table. In some embodiments, the second passenger seat assembly is rotated 180° relative to the first passenger seat assembly such that the table of the first passenger seat assembly is proximate to the table of the second passenger seat assembly. In various embodiments, the passenger seat arrangement includes a privacy divider between the table of the first passenger seat assembly and the table of the second passenger seat assembly and the privacy divider is movable between a stowed position and a deployed position. In some examples, in the stowed position, the privacy divider, table of the first passenger seat assembly, and the table of the second passenger seat assembly define an extended table surface, and, in the deployed position, the privacy divider physically separates the table of the first passenger seat assembly from the table of the second passenger seat assembly. In certain embodiments, the second passenger seat assembly is rotated 180° relative to the first passenger seat assembly such that the opening of the first passenger seat assembly is proximate to the opening of the second passenger seat assembly.

According to certain embodiments of the present invention, a method of installing a passenger seat arrangement includes providing two passenger seat assemblies. Each passenger seat assembly includes a first wall, a second wall opposite from the first wall, and a passenger seat comprising a first side and a second side opposite from the first side. The passenger seat is positioned between the first wall and the second wall such that the first side is proximate to the first wall and the second side is proximate to the second wall. The method includes positioning a first passenger seat assembly of the two passenger seat assemblies is in a forward-facing configuration, and positioning a second passenger seat assembly of the two passenger seat assemblies is in an aft-facing configuration. The second passenger seat assembly is rotated 180° relative to the first passenger seat assembly.

In various aspects, positioning the second passenger seat assembly includes rotating the second passenger seat assembly 180° clockwise relative to the first passenger seat assembly. In some cases, positioning the second passenger seat assembly includes rotating the second passenger seat assembly 180° counter-clockwise relative to the first passenger seat assembly.

In some examples, the first wall of each passenger seat assembly defines an opening providing access to the passenger seat, and the second wall of each passenger seat assembly comprises a table. In some embodiments, positioning the second passenger seat assembly includes rotating the second passenger seat assembly 180° relative to the first passenger seat assembly such that the table of the first passenger seat assembly is proximate to the table of the second passenger seat assembly. In various embodiments, positioning the second passenger seat assembly includes rotating the second passenger seat assembly 180° relative to the first passenger seat assembly such that the opening of the first passenger seat assembly is proximate to the opening of the second passenger seat assembly.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a business class seat arrangement for a passenger vehicle cabin, such as an aircraft cabin, and seat assemblies that may be used in such an arrangement. While the seat arrangement and seat assemblies are discussed for use with aircraft seats in an aircraft cabin, they are by no means so limited. Rather, embodiments of the seat arrangements and seat assemblies may be used in passenger seats or other seats of any type or otherwise as desired. As used here, "TTL" stands for "taxiing, take-off, and landing."

In some embodiments, disclosed is a passenger seat arrangement with passenger seat assemblies where the same passenger seat assembly can be provided in either a forward-facing configuration or an aft-facing configuration. Each passenger seat assembly includes a seat shell having a first wall and a second wall, and a passenger seat is positioned between the first wall and the second wall. In both the forward-facing configuration and the aft-facing configuration, the first wall is proximate to a first side of the passenger seat and the second wall is proximate to a second side of the passenger seat. As discussed in detail below, the passenger seat arrangement with passenger seat assemblies according to the present disclosure is cheaper to assemble and can be assembled more quickly compared to traditional seats because a single type of mold and a single set of parts and tooling is needed to provide seats for both the forward-facing and aft-facing configurations. In addition, the passenger seat arrangement with passenger seat assemblies according to the present disclosure is quickly and easily modified to accommodate both sides of a cabin by modifying one of the walls of the seat shell. Various other improvements and advantages may be realized with the passenger seat arrangements and passenger seat assemblies.

Figure 1:
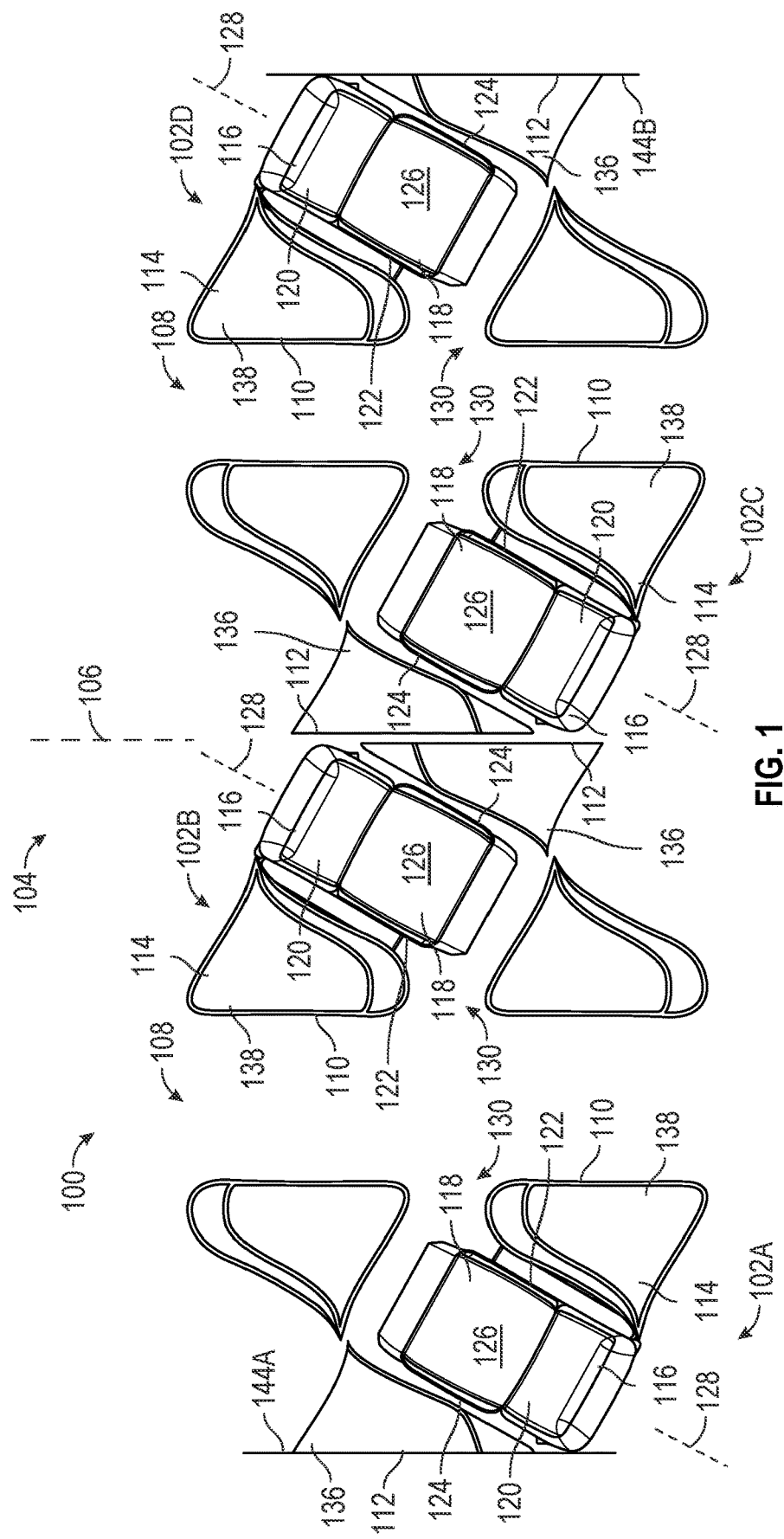
FIG. 1 is a schematic of a passenger seat arrangement with passenger seat assemblies according to certain embodiments of the present invention.
Figure 2:
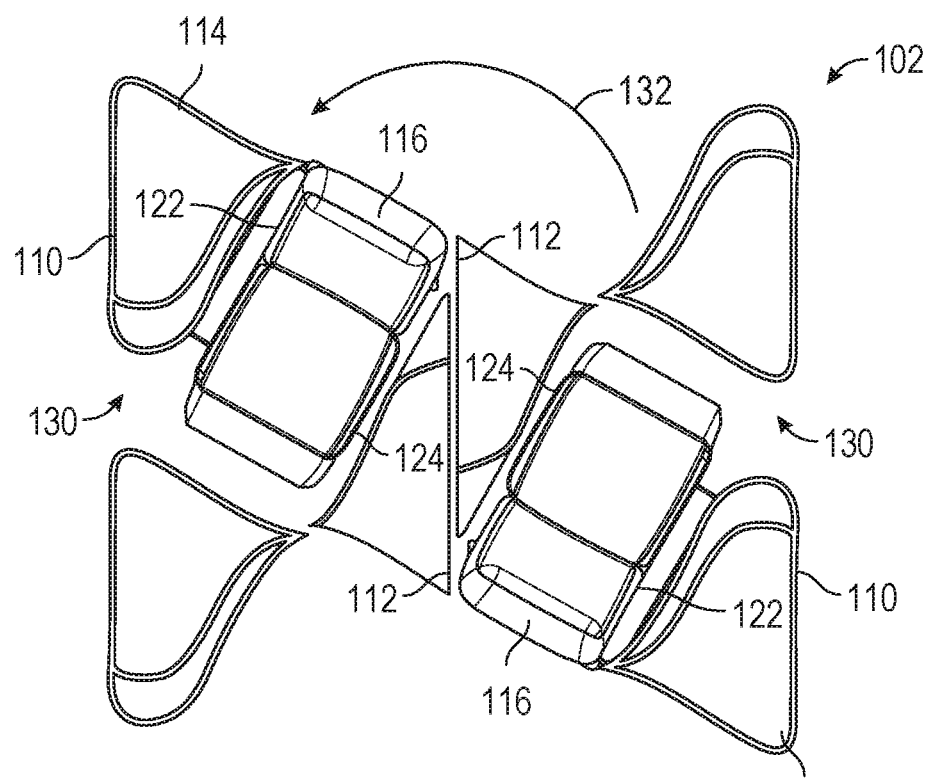
FIG. 2 is a schematic of one of the passenger seat assemblies of the passenger seat arrangement of FIG. 1.
Figure 3:
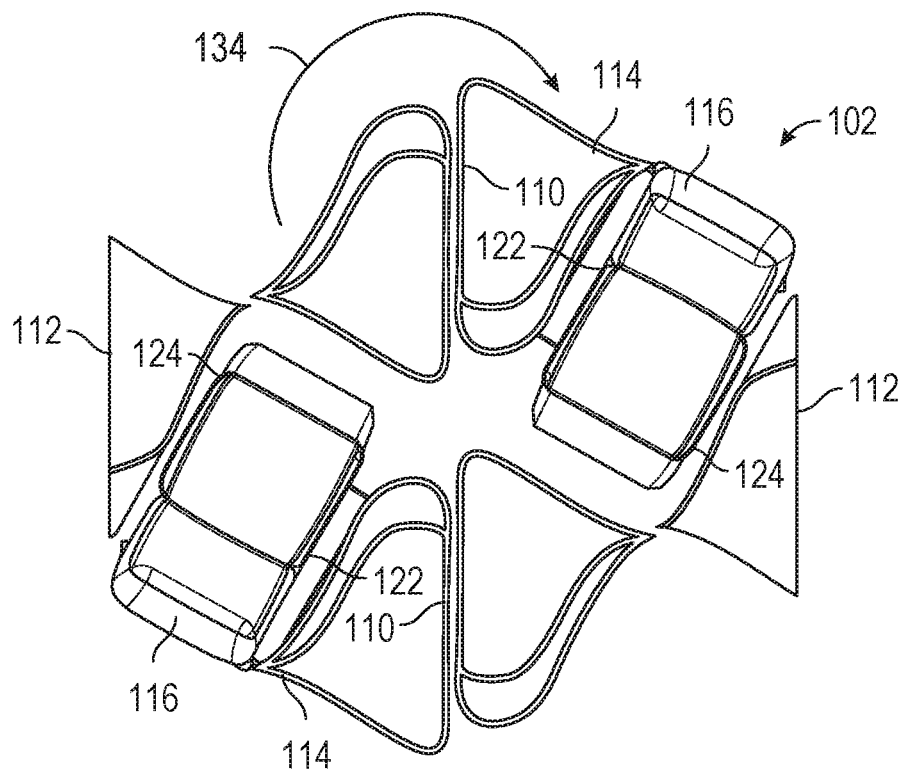
FIG. 3 is another schematic of one of the passenger seat assemblies of the passenger seat arrangement of FIG. 1.

According to certain embodiments of the present disclosure, as shown in FIGS. 1-3, a passenger seat arrangement 100 in a cabin 104 of a passenger vehicle such as an aircraft includes at least one passenger seat assembly 102. In the example of FIGS. 1-3, the cabin 104 defines a central axis 106 that extends in a generally forward and aft direction. The cabin 104 also defines two aisles 108. The number and/or location of the aisles 108 should not be considered limiting on the current disclosure. In some cases, the number and/or location of the aisles 108 may at least partially depend on the number of passenger seat assemblies 102 as discussed below.

FIG. 1 illustrates one row of the passenger seat arrangement 100 that includes four passenger seat assemblies 102A-D. However, the number of passenger seat assemblies 102 in one row of the passenger seat arrangement 100 and/or in the overall passenger seat arrangement 100 should not be considered limiting on the current disclosure, as in other examples, any desired number of passenger seat assemblies may be utilized. For example, the passenger seat arrangement 100 may include one passenger seat assembly, two passenger seat assemblies, three passenger seat assemblies, or more than four passenger seat assemblies.

Each passenger seat assembly 102 includes a seat shell 114 having a first wall 110 and a second wall 112 that is opposite from the first wall 110. The seat shell 114 may be formed from various suitable materials including, but not limited to, m aluminum, stainless steel, aramid fibers, polycarbonate, polypropylene, other metallic materials, composite materials, combinations thereof, or other similar materials. The particular shape of the seat shell 114, including the first wall 110 and the second wall 112, should not be considered limiting on the current disclosure.

In various examples, the first wall 110 and/or the second wall 112 of each passenger seat assembly 102 may include various accessories such as tables 136, storage cabinets 138, in-flight entertainment (IFE) monitors and equipment, etc. as desired. In some examples, and as discussed in detail below, because each passenger seat assembly 102 is configurable between the forward-facing configuration and the aft-facing configuration, the same type of accessory may be used in both forward-facing and aft-facing passenger seat assemblies 102.

Each passenger seat assembly 102 also includes a passenger seat 116 that is positioned between the first wall 110 and the second wall 112. As illustrated in FIGS. 1-3, the first wall 110 defines an opening 130 that provides access to the passenger seat 116 through the first wall 110. The passenger seat 116 includes a seat base 118 and a seat back 120. In various examples, the seat back 120 is movable relative to the seat base 118 such that the passenger seat 116 can be positioned in various configurations, such as a TTL configuration, a lie-flat configuration (see, e.g., passenger seat assemblies 102A-B in FIG. 4), a reclined configuration (see, e.g., passenger seat assemblies 102C-D in FIG. 4), etc. The passenger seat 116 has a first side 122 and a second side 124 that is opposite from the first side 122. In various examples, a seat surface 126 that a passenger may position her or his body against when used extends from proximate the first side 122 to proximate the second side 124.

Each passenger seat 116 has a seat axis 128. In some examples, the passenger seat 116 is provided between the first wall 110 and the second wall 112 such that that seat axis 128 extends at an oblique angle relative to the central axis 106. However, in other examples, the passenger seat 116 is provided such that the seat axis 128 is substantially parallel to the central axis 106. In examples where a plurality of passenger seat assemblies 102 are provided, such as the example of FIGS. 1-3, the angle of the seat axis 128 of one passenger seat assembly 102 relative to the central axis 106 may be the same as the angle of a seat axis 128 of another passenger seat assembly 102. In other examples, the angle of the seat axis 128 of one passenger seat assembly 102 relative to the central axis 106 may be different from the angle of a seat axis 128 of another passenger seat assembly 102.

As illustrated in FIGS. 1-3, the passenger seat 116 of each passenger seat assembly 102A-D is positioned such that the first side 122 of the passenger seat 116 is proximate to the first wall 110 and the second side 124 of the passenger seat 116 is proximate to the second wall 112 in both the forward-facing configuration (see passenger seat assemblies 102A and 102C in FIG. 1) and the aft-facing configuration (see passenger seat assemblies 102B and 102D in FIG. 1). In some cases, the first side 122 is positioned adjacent to the first wall 110 and the second side 124 is positioned adjacent to the second wall 112 in both the forward-facing configuration and the aft-facing configuration, although they need not be in other examples, and various accessories such as tables 136, storage cabinets 138, in-flight entertainment (IFE) monitors and equipment, etc. may be provided between the sides and the respective walls.

In various examples, and as illustrated in FIG. 2, the passenger seat assembly 102 is configurable between the forward-facing configuration and the aft-facing configuration by rotating the passenger seat assembly 102 in a counter-clockwise direction 132. In other examples, and as illustrated in FIG. 3, the passenger seat assembly 102 is configurable between the forward-facing configuration and the aft-facing configuration by rotating the passenger seat assembly in a clockwise direction 134. In certain cases, the passenger seat assembly 102 is configurable between the forward-facing configuration and the aft-facing configuration by rotating the passenger seat assembly 102 180° in either the counter-clockwise direction 132 or the clockwise direction 134. In other examples, the passenger seat assembly 102 is configurable by rotating the passenger seat assembly 102 from about 0° to about 180° in either the counter-clockwise direction 132 or the clockwise direction 134. In various cases, the passenger seat assembly 102 is configurable by rotating the passenger seat assembly 102 from about 90° to about 180° in either the counter-clockwise direction 132 or the clockwise direction 134. In other cases, the passenger seat assembly 102 may be rotated in various other increments other than 90° or 180° in either the counter-clockwise direction 132 or the clockwise direction 134.

Referring to FIG. 1, in some examples with a plurality of passenger seat assemblies, adjacent passenger seat assemblies may be rotated in different directions. For example, in FIG. 1, compared to passenger seat assembly 102B, the passenger seat assembly 102A is rotated 180° in the counter-clockwise direction 132 and the passenger seat assembly 102C is rotated 180° in the clockwise direction 134. In some cases, adjacent passenger seat assemblies 102 are rotated relative to each other such that the first walls 110 are proximate to each other (see, e.g., passenger seat assemblies 102A-B). In such examples, the openings 130 in the first walls 110 may be provided proximate to each other. Optionally, the first walls 110 are positioned adjacent to each other such that the openings 130 are in communication with each other. In other examples, adjacent passenger seat assemblies 102 are rotated relative to each other such that the second walls 112 are proximate to each other (see, e.g., passenger seat assemblies 102B-C). Optionally, the second walls 112 are positioned adjacent to each other. As described in detail below with reference to FIGS. 4-5B, the first walls 110 may be positioned adjacent to each other and/or the second walls 112 may be positioned adjacent to each other in the passenger seat arrangement such that various accessories such as tables 136, storage cabinets 138, in-flight entertainment (IFE) monitors and equipment, etc. can be selectively shared or combined between adjacent passenger seat assemblies 102 for a shared passenger experience during use and/or to generate passenger interaction.

Referring back to FIG. 1, in some examples, cabin walls 144A-B of the cabin 104 may be curved or have various shapes. In such examples, the same passenger seat assembly 102 used in other portions of the cabin 104 may still be utilized. In addition, because the passenger seat assemblies 102 are configurable in forward-facing and aft-facing configurations, a single wall of the passenger seat assembly 102 can be modified (e.g., through cutting, molding, forming, etc.) such that the passenger seat assembly 102 can be positioned adjacent to either of the cabin walls 144A-B. In the example of FIG. 1, the second wall 112 of the passenger seat assembly 102A and the second wall 112 of the passenger seat assembly 102D are both modified to fit the curvature of the cabin walls 144A-B.

Figure 4:
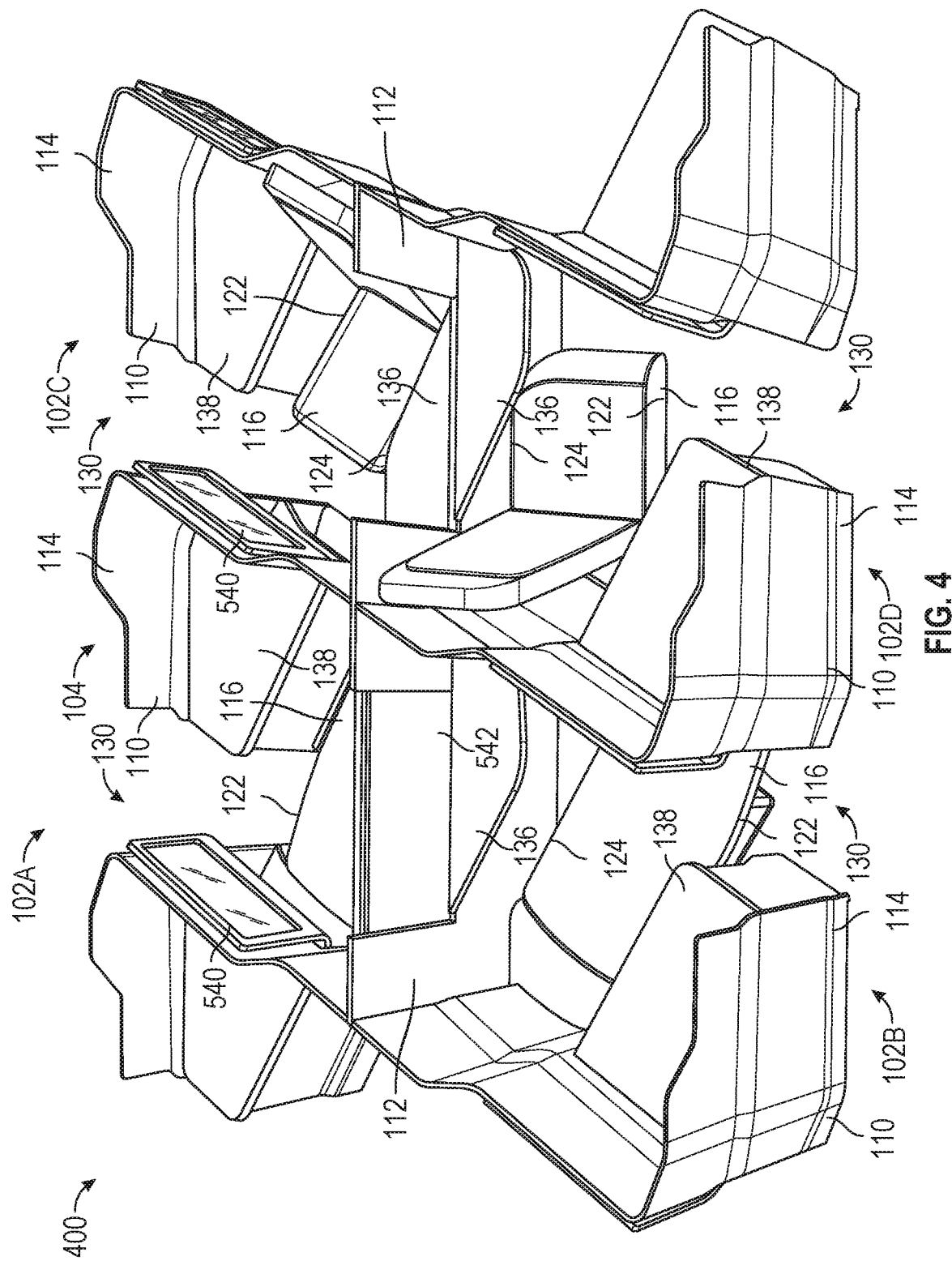
FIG. 4 is a perspective view of a passenger seat arrangement with passenger seat assemblies according to certain embodiments of the present invention.
Figure 5A:
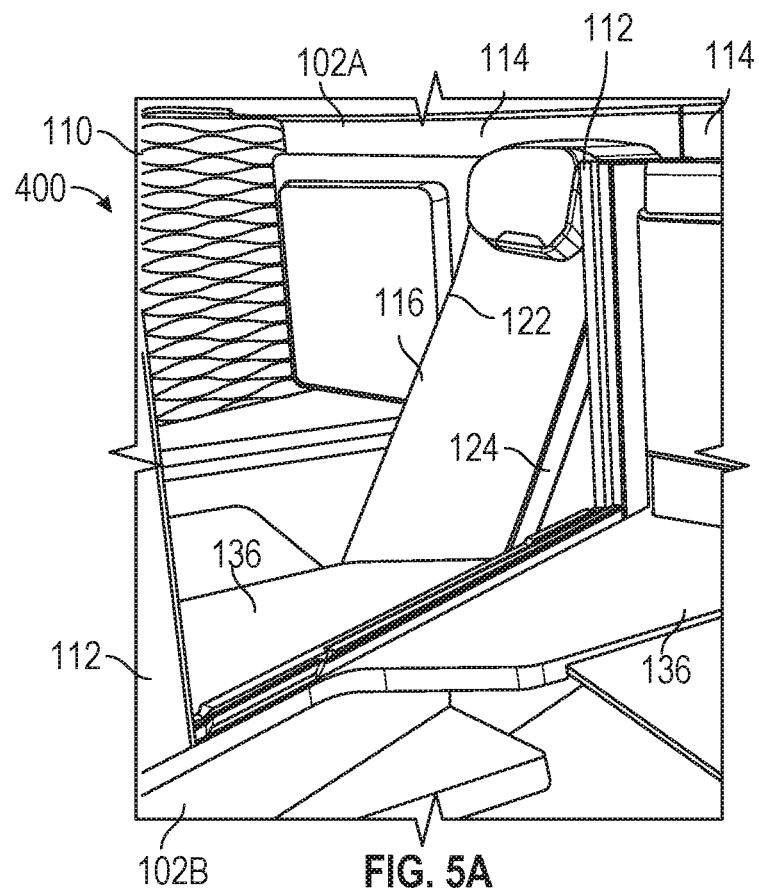
FIG. 5A is a perspective view of a portion of the passenger seat arrangement of FIG. 4 with a privacy divider in a stowed configuration.
Figure 5B:
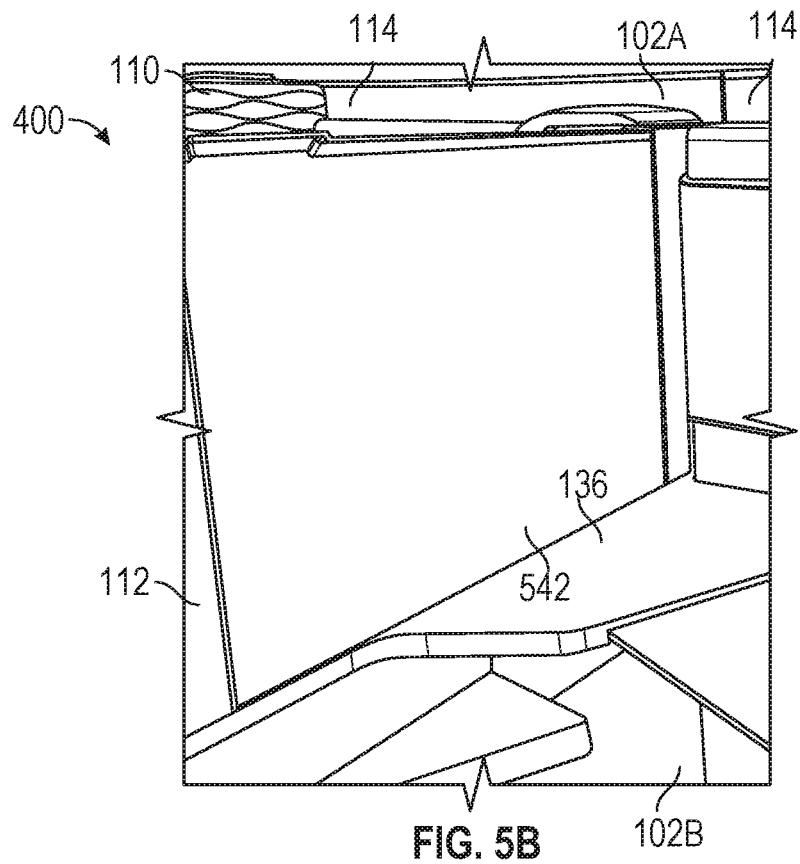
FIG. 5B is a perspective view of the portion of the passenger seat arrangement of FIG. 5A with the privacy divider in a deployed configuration.
Figure 6:
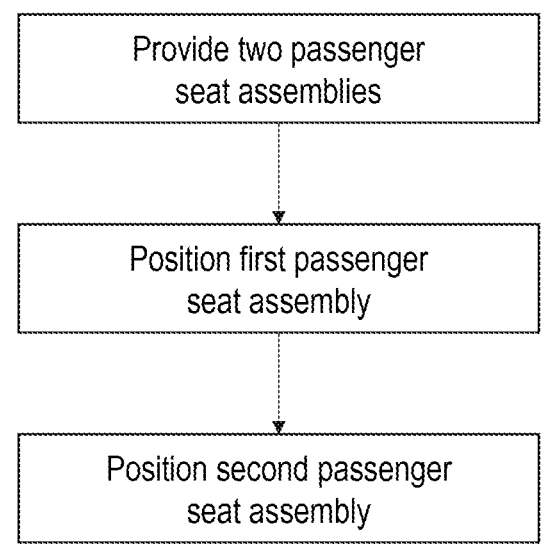
FIG. 6 is a flowchart of a method according to embodiments of the disclosure.

FIGS. 4-5B illustrate another example of a passenger seat arrangement 400 with four passenger seat assemblies 102A-D arranged in two rows. The passenger seat arrangement 400 is substantially similar to the passenger seat arrangement 100 except the shape of the first wall 110 and the shape of the second wall 112 is different. In addition, the passenger seat arrangement 400 further includes IFE monitors 540 with each passenger seat assembly 102A-D.

The passenger seat arrangement 400 further includes a privacy divider 542 between adjacent passenger seat assemblies 102. In some examples, the privacy divider 542 is provided as a component of the second wall 112 and/or the first wall 110 of at least one of the passenger seat assemblies 102. In the example of FIGS. 4-5B, one privacy divider 542 is provided as a component of the second wall 112 of the passenger seat assembly 102A and another privacy divider 542 is provided as a component of the second wall 112 of the passenger seat assembly 102C. The privacy divider 542 may be provided in various other locations as desired, and the number of privacy dividers 542 with the passenger seat arrangement 400 should not be considered limiting on the current disclosure.

In various examples, the privacy divider 542 is movable between a stowed position (see FIG. 5A) and a deployed position (see FIG. 5B). In some cases, moving the privacy divider 542 between the stowed position and the deployed position may selectively allow adjacent passenger seat assemblies 102 to combine and/or share accessories. As illustrated in FIGS. 5A-B, in some examples, the second walls 112 of each passenger seat assembly 102 includes the table 136. In some examples and as illustrated in FIG. 5A, when the privacy divider 542 is in the stowed position, the tables 136 together define an extended table surface that can be shared by passengers in both of the passenger seat assemblies 102A-B. As illustrated in FIG. 5B, when the privacy divider 542 is in the deployed position, the tables 136 are physically separated. It will be appreciated that the example of FIGS. 5A-B should not be considered limiting on the current disclosure as in other examples, various other accessories may be selectively combined or isolated as desired.

A method of installing the passenger seat arrangement 100 or the passenger seat arrangement 400 is also provided. In various examples, the method includes providing at least two passenger seat assemblies. The method includes positioning a first passenger seat assembly of the two passenger seat assemblies in a forward-facing configuration within a vehicle cabin positioning a second passenger seat assembly of the two passenger seat assemblies in an aft-facing configuration in the vehicle cabin. In various aspects, the second passenger seat assembly is rotated 180° relative to the first passenger seat assembly. In some examples, positioning the second passenger seat assembly includes rotating the second passenger seat assembly 180° clockwise relative to the first passenger seat assembly. In other examples, positioning the second passenger seat assembly includes rotating the second passenger seat assembly 180° counter-clockwise relative to the first passenger seat assembly. In some cases, positioning the second passenger seat assembly includes rotating the second passenger seat assembly 180° relative to the first passenger seat assembly such that the table of the first passenger seat assembly is proximate to the table of the second passenger seat assembly. In certain embodiments, positioning the first passenger seat assembly or the second passenger seat assembly includes positioning the seat of the passenger assembly such that the seat axis is at an oblique angle relative to a central axis of the cabin of the vehicle.

A collection of exemplary examples, including at least some explicitly enumerated as "ECs" (Example Combinations), providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

EC 1. A passenger seat assembly comprising: a first wall; a second wall opposite from the first wall; and a passenger seat comprising a first side and a second side opposite from the first side, wherein the passenger seat is positioned between the first wall and the second wall, wherein the passenger seat assembly is positionable between a forward-facing configuration and an aft-facing configuration, and wherein, in both the forward-facing configuration and the aft-facing configuration, the first wall is proximate to the first side of the passenger seat and the second wall is proximate to the second side of the passenger seat.

EC 2. The passenger seat assembly of any of the preceding or subsequent example combinations, wherein the passenger seat assembly is configurable between the forward-facing configuration and the aft-facing configuration by rotating the passenger seat assembly in a clockwise direction EC 3. The passenger seat assembly of any of the preceding or subsequent example combinations, wherein the first wall defines an opening providing access to the passenger seat.

EC 4. The passenger seat assembly of any of the preceding or subsequent example combinations, wherein the second wall comprises a privacy divider that is movable between a stowed position and a deployed position.

EC 5. The passenger seat assembly of any of the preceding or subsequent example combinations, wherein the second wall further comprises a table.

EC 6. The passenger seat assembly of any of the preceding or subsequent example combinations, wherein the passenger seat assembly is configurable between the forward-facing configuration and the aft-facing configuration by rotating the passenger seat assembly in a counter-clockwise direction.

EC 7. The passenger seat assembly of any of the preceding or subsequent example combinations, wherein the passenger seat comprises a passenger seat surface extending between the first side and the second side, wherein the passenger seat surface is configured to support a passenger when used, and wherein an orientation of the passenger seat surface relative to the first wall and the second wall is the same in both the forward-facing configuration and the aft-facing configuration.

EC 8. A passenger seat arrangement comprising two passenger seat assemblies, wherein each passenger seat assembly comprises: a first wall; a second wall opposite from the first wall; and a passenger seat comprising a first side and a second side opposite from the first side, wherein the passenger seat is positioned between the first wall and the second wall such that the first side is proximate to the first wall and the second side is proximate to the second wall, wherein a first passenger seat assembly of the two passenger seat assemblies is in a forward-facing configuration and a second passenger seat assembly of the two passenger seat assemblies is in an aft-facing configuration, and wherein the second passenger seat assembly is rotated 180° relative to the first passenger seat assembly.

EC 9. The passenger seat arrangement of any of the preceding or subsequent example combinations, wherein the second passenger seat assembly is rotated 180° clockwise relative to the first passenger seat assembly.

EC 10. The passenger seat arrangement of any of the preceding or subsequent example combinations, wherein the second passenger seat assembly is rotated 180° counter-clockwise relative to the first passenger seat assembly.

EC 11. The passenger seat arrangement of any of the preceding or subsequent example combinations, wherein the first wall of each passenger seat assembly defines an opening providing access to the passenger seat, and wherein the second wall of each passenger seat assembly comprises a table.

EC 12. The passenger seat arrangement of any of the preceding or subsequent example combinations, wherein the second passenger seat assembly is rotated 180° relative to the first passenger seat assembly such that the table of the first passenger seat assembly is proximate to the table of the second passenger seat assembly.

EC 13. The passenger seat arrangement of any of the preceding or subsequent example combinations, further comprising a privacy divider between the table of the first passenger seat assembly and the table of the second passenger seat assembly, wherein the privacy divider is movable between a stowed position and a deployed position, wherein, in the stowed position, the privacy divider, table of the first passenger seat assembly, and the table of the second passenger seat assembly define an extended table surface, and wherein, in the deployed position, the privacy divider physically separates the table of the first passenger seat assembly from the table of the second passenger seat assembly.

EC 14. The passenger seat arrangement of any of the preceding or subsequent example combinations, wherein the second passenger seat assembly is rotated 180° relative to the first passenger seat assembly such that the opening of the first passenger seat assembly is proximate to the opening of the second passenger seat assembly.

EC 15. A method of installing a passenger seat arrangement, the method comprising: providing two passenger seat assemblies, wherein each passenger seat assembly comprises a first wall, a second wall opposite from the first wall, and a passenger seat comprising a first side and a second side opposite from the first side, wherein the passenger seat is positioned between the first wall and the second wall such that the first side is proximate to the first wall and the second side is proximate to the second wall; positioning a first passenger seat assembly of the two passenger seat assemblies is in a forward-facing configuration; and positioning a second passenger seat assembly of the two passenger seat assemblies is in an aft-facing configuration, wherein the second passenger seat assembly is rotated 180° relative to the first passenger seat assembly.

EC 16. The method of any of the preceding or subsequent example combinations, wherein positioning the second passenger seat assembly comprises rotating the second passenger seat assembly 180° clockwise relative to the first passenger seat assembly.

EC 17. The method of any of the preceding or subsequent example combinations, wherein positioning the second passenger seat assembly comprises rotating the second passenger seat assembly 180° counter-clockwise relative to the first passenger seat assembly.

EC 18. The method of any of the preceding or subsequent example combinations, wherein the first wall of each passenger seat assembly defines an opening providing access to the passenger seat, and wherein the second wall of each passenger seat assembly comprises a table.

EC 19. The method of any of the preceding or subsequent example combinations, wherein positioning the second passenger seat assembly comprises rotating the second passenger seat assembly 180° relative to the first passenger seat assembly such that the table of the first passenger seat assembly is proximate to the table of the second passenger seat assembly.

EC 20. The method of any of the preceding or subsequent example combinations, wherein positioning the second passenger seat assembly comprises rotating the second passenger seat assembly 180° relative to the first passenger seat assembly such that the opening of the first passenger seat assembly is proximate to the opening of the second passenger seat assembly.

EC 21. The method of any of the preceding or subsequent example combinations, wherein the passenger seat of the first passenger seat assembly comprises a first seat axis, and wherein positioning the first passenger seat assembly comprises positioning the first passenger seat assembly such that the first seat axis extends at an oblique angle relative to a central axis of the vehicle cabin.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat arrangement configured to be installed along a longitudinal direction of a vehicle and relative to a longitudinal axis, the passenger seat arrangement comprising a first passenger seat assembly and a second passenger seat assembly, the first and second passenger seat assemblies arranged in a lateral direction such that the first passenger seat assembly is adjacent to the second passenger seat assembly in the lateral direction,
   wherein each passenger seat assembly comprises:
      a first side wall comprising a first wall portion and a second wall portion, wherein an opening is defined between the first wall portion and the second wall portion, the opening providing access to the passenger seat assembly in the lateral direction;
      a second side wall opposite from the first side wall, the second side wall comprising a table; and
      a passenger seat comprising a first side and a second side opposite from the first side, wherein the passenger seat is positioned between the first side wall and the second side wall such that the first side is proximate to the first side wall and the second side is proximate to the second side wall, wherein each passenger seat comprises a seat axis,
   wherein the first passenger seat assembly is in a forward-facing configuration relative to the passenger seat arrangement and the second passenger seat assembly is in an aft-facing configuration relative to the passenger seat arrangement, and wherein the second side walls of the first passenger seat assembly and the second passenger seat assembly are positioned such that the table of the first passenger seat assembly is proximate to the table of the second passenger seat assembly, wherein the seat axis of the passenger seat of the forward-facing first passenger seat assembly is parallel to the seat axis of the passenger seat of the aft-facing second passenger seat assembly, wherein the seat axis of the passenger seat of the first passenger seat assembly and the seat axis of the passenger seat of the second passenger seat assembly each intersect the longitudinal axis, wherein each of the respective first side wall and second side wall are parallel and positioned at an oblique angle relative to the respective seat axis of the first passenger seat assembly and the seat axis of the second passenger seat assembly, and wherein each of the first and second side walls is parallel to the longitudinal axis.

2. A method of installing a passenger seat arrangement along a longitudinal direction of a vehicle and relative to a longitudinal axis, the method comprising:

providing two passenger seat assemblies arranged in a lateral direction, wherein each passenger seat assembly comprises:

a first side wall comprising a first wall portion and a second wall portion, wherein an opening is defined between the first wall portion and the second wall portion, the opening providing access to the passenger seat assembly in the lateral direction, a second side wall opposite from the first side wall, the second side wall comprising a table, and a passenger seat comprising a first side and a second side opposite from the first side, wherein the passenger seat is positioned between the first side wall and the second side wall such that the first side is proximate to the first side wall and the second side is proximate to the second side wall, wherein each passenger seat comprises a seat axis;

positioning a first passenger seat assembly of the two passenger seat assemblies in a forward-facing configuration within a vehicle cabin; and positioning a second passenger seat assembly of the two passenger seat assemblies in an aft-facing configuration in the vehicle cabin and such that the table of the first passenger seat assembly is proximate to the table of the second passenger seat assembly, wherein the seat axis of the passenger seat of the forward-facing first passenger seat assembly is parallel to the seat axis of the passenger seat of the aft-facing second passenger seat assembly, wherein the seat axis of the passenger seat of the first passenger seat assembly and the seat axis of the passenger seat of the second passenger seat assembly each intersect the longitudinal axis, wherein each of the respective first side wall and second side wall are parallel and positioned at an oblique angle relative to the respective seat axis of the first passenger seat assembly and the seat axis of the second passenger seat assembly, and wherein each of the first and second side walls is parallel to the longitudinal axis.

\* \* \* \* \*